US012146701B2

(12) United States Patent
Seo et al.

(10) Patent No.: US 12,146,701 B2

(45) Date of Patent: Nov. 19, 2024

(54) ELECTRONIC DEVICE

(71) Applicants: Samsung Electronics Co., Ltd., Suwon-si (KR); EPTECH CO., LTD., Bucheon-si (KR)

(72) Inventors: Junwon Seo, Suwon-si (KR); Wangi Park, Suwon-si (KR); Chunho Byun, Suwon-si (KR); Hojin Shin, Suwon-si (KR); Geonhee Lee, Suwon-si (KR); Sanggyu Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 17/503,050

(22) Filed: Oct. 15, 2021

(65) Prior Publication Data

US 2022/0034578 A1 Feb. 3, 2022

Related U.S. Application Data

(63) Continuation of application No. PCT/KR2021/008878, filed on Jul. 12, 2021.

(30) Foreign Application Priority Data

Jul. 28, 2020 (KR) ........................ 10-2020-0093998

(51) Int. Cl.
*F25D 23/02* (2006.01)
*E05F 1/12* (2006.01)

(52) U.S. Cl.
CPC .......... *F25D 23/028* (2013.01); *E05F 1/1253* (2013.01); *E05Y 2201/224* (2013.01);
(Continued)

(58) Field of Classification Search
CPC ... E05F 1/1253; E05F 3/20; E05F 3/18; E05F 5/02; E05F 5/027; E05Y 2201/224;
(Continued)

(56) References Cited

U.S. PATENT DOCUMENTS 7,987,558 B2 8/2011 Beckmann et al.
8,225,459 B2 7/2012 Waltemate et al.
(Continued)

FOREIGN PATENT DOCUMENTS

CN 108332498 A * 7/2018 ........... F25D 23/028
JP 2010-522862 A 7/2010
(Continued)

OTHER PUBLICATIONS

International Search Report and Written Opinion of the International Searching Authority dated Oct. 21, 2021, in connection with International Application No. PCT/KR2021/008878, 9 pages.

*Primary Examiner* — Hiwot E Tefera

(57) ABSTRACT

Disclosed is an electronic device in which a multi joint hinge, which couples a door of the electronic device, is applied. The electronic device includes a main body having a storage space therein, a door configured to open and close the storage space, and a hinge coupled to the door and the main body in order to rotate the door with respect to the main body. The hinge includes a first bracket supported by the main body, a second bracket supported by the door, a link rotatably coupled between the first bracket and the second bracket, a resilient member provided on the link and having an elasticity; a cam provided on the second bracket and formed in a shape to contact with the resilient member, so that according to a rotation direction of the door, the elasticity of the resilient member acts as an opening force or a closing force of the door, and a cam stopper integrally formed with the second bracket to prevent the cam from being moved by the elasticity of the resilient member.

18 Claims, 13 Drawing Sheets

(52) U.S. Cl.
CPC ..... *E05Y 2201/638* (2013.01); *E05Y 2900/31* (2013.01); *F25D 2323/024* (2013.01)

(58) Field of Classification Search
CPC ........... E05Y 2201/638; E05Y 2900/31; E05Y 2800/41; E05Y 2201/21; E05Y 2201/412; F25D 2323/024; F25D 23/028; E05D 2003/166; E05D 3/16
See application file for complete search history.

(56) References Cited

U.S. PATENT DOCUMENTS

| | | | | |
|---|---|---|---|---|
| 8,296,906 | B2 * | 10/2012 | Wisniewski | E05D 3/14 16/302 |
| 8,887,355 | B2 | 11/2014 | Kleemann et al. | |
| 10,731,392 | B2 * | 8/2020 | Salice | E05D 15/40 |
| 11,629,542 | B2 * | 4/2023 | Lee | E05D 3/18 16/304 |
| 11,781,362 | B2 * | 10/2023 | Lee | E05D 11/1028 16/50 |
| 2008/0276422 | A1 * | 11/2008 | Beckmann | E05F 1/1253 16/258 |
| 2010/0101052 | A1 | 4/2010 | Waltemate et al. | |
| 2018/0196385 | A1 * | 7/2018 | Kondo | E05F 1/1253 |
| 2019/0285335 | A1 * | 9/2019 | Hunter | E05D 11/06 |
| 2019/0383081 | A1 * | 12/2019 | Thielmann | E05D 11/0054 |
| 2020/0056829 | A1 * | 2/2020 | Cai | E05F 1/1253 |
| 2020/0131830 | A1 * | 4/2020 | Byun | E05D 11/0054 |
| 2021/0238902 | A1 | 8/2021 | Byun | |

FOREIGN PATENT DOCUMENTS

| | | | | |
|---|---|---|---|---|
| KR | 20-0275876 | Y1 | 5/2002 | |
| KR | 10-2012-0041388 | A | 5/2012 | |
| KR | 10-1225097 | B1 | 1/2013 | |
| KR | 10-1384202 | B1 | 4/2014 | |
| KR | 10-1497295 | B1 | 3/2015 | |
| KR | 10-1715301 | B1 | 3/2017 | |
| KR | 10-1921098 | B1 | 11/2018 | |
| KR | 101958292 | B1 * | 3/2019 | E05D 3/16 |
| KR | 10-1971950 | B1 | 4/2019 | |
| KR | 10-2021985 | B1 | 9/2019 | |
| KR | 10-2070695 | B1 | 1/2020 | |

* cited by examiner

ELECTRONIC DEVICE

CROSS-REFERENCE TO RELATED APPLICATIONS

This application is a continuation of International Application No. PCT/KR2021/008878 filed on Jul. 12, 2021, which claims priority to Korean Patent Application No. 10-2020-0093998 filed on Jul. 28, 2020, the disclosures of which are herein incorporated by reference in their entirety.

BACKGROUND

1. Field

The disclosure relates to an electronic device, and more particularly to a multi joint hinge, which couples a door of the electronic device to be openable and closable.

2. Description of Related Art

In general, a refrigerator is provided with a main body in which a refrigerator compartment or a freezer compartment is formed, and a door hinged to the main body to open and close the main body. As the door is rotated, the main body is opened and closed.

In recent, kitchen-fit or build-in type space utilization methods are on the rise. In the face of growing requirements for seam-less design, a utilization of door opening method, which can be opened and closed without interference with neighboring products or doors, is increasing.

Since an articulation type hinge rotates the door while moving the door forward through a scissor-shaped motion, it can open and close the door without problems even if the spacing between neighboring devices is close. Here, force received by each joint when the door is closed is minimized, and force received by each joint when the door is opened is maximized. Depending on repeated opening and closing operations in an actual process of use, each joint is subjected to repeated load resulting in breakage.

Among various components that constitute the hinge, a door bracket, which is secured to the door, is configured to leave a bridge on both sides of a plate, which forms the bracket, to support a link member, and cut and bend a center of the plate to form a link support. According to the repeated opening and closing of the door, the bridge of the door bracket is first broken due to a narrow width of the bridge. If the bridge is broken, a fixed state of the door becomes unstable, and door fixing parts separated into the top and bottom depend on only two rivets to become incompletely fixed. According to this, a support that prevents a movement of a cam, which optionally switches and maintains between a closed position and an opened position of the door, may lead to a state of departure or breakage. As a result, the hinge loses its elasticity function, which maintains closing force, thereby causing a user to perceive it as a failure to lead to a decrease in its reliability.

An aspect of the disclosure is to provide an electronic device, which has an excellent durability and that can reduce a manufacturing cost.

SUMMARY

According to an embodiment of the disclosure, there is provided an electronic device. The electronic device includes a main body having a storage space therein, a door configured to open and close the storage space, and a hinge coupled to the door and the main body in order to rotate the door with respect to the main body. The hinge includes a first bracket supported by the main body, a second bracket supported by the door, a link rotatably coupled between the first bracket and the second bracket, a resilient member provided on the link and having an elasticity; a cam provided on the second bracket and formed in a shape to contact the resilient member, so that according to a rotation direction of the door, the elasticity of the resilient member acts as an opening force or a closing force of the door, and a cam stopper integrally formed with the second bracket to prevent the cam from being moved by the elasticity of the resilient member.

The cam may be formed in a shape of a triangular column.

The cam may include a support surface provided parallel with a plate surface of the second bracket, and the triangular column of the cam may be provided on an opposite side of the support surface piping may be provided at an upper position than the fluid storage.

The cam may include a hanging jaw to support the cam stopper.

The cam stopper may be integrally extended from the second bracket to be parallel with the support surface.

The support surface is configured to come in contact with the cam stopper.

The cam stopper may include a through hole, and the support surface may be provided with a projection, which is inserted into the through hole.

The support surface may include a groove, and the cam stopper may include a projection, which is inserted into the groove and integrally projects from the second bracket.

The cam stopper may be integrally bent and project from a plate surface of the second bracket to support the cam.

The electronic device can further include a hinge pin that couples the cam to the second bracket together with an end of the link.

The cam may include a hinge coupling hole in a form of a polygon column, which extends in up and down directions thereof, and the hinge pin may include a portion that has a cross section in the form of a polygon is inserted into the hinge coupling hole.

According to an embodiment of the disclosure, there is provided a refrigerator. The refrigerator includes: a main body having a refrigerator compartment and a freezer compartment; at least one door configured to open and close the refrigerator compartment and the freezer compartment; and a hinge coupled to a door of the at least one door and the main body in order to rotate the door with respect to the main body. The hinge includes: a first bracket supported by the main body; a second bracket supported by the door; a link rotatably coupled between the first bracket and the second bracket; a resilient member provided on the link and having an elasticity; a cam provided on the second bracket and formed in a shape to contact the resilient member, so that according to a rotation direction of the door, the elasticity of the resilient member acts as an opening force or a closing force of the door; and a cam stopper integrally formed with the second bracket to prevent the cam from being moved by the elasticity of the resilient member.

The cam may be formed in a shape of a triangular column.

The cam may include a support surface provided parallel with a plate surface of the second bracket, and the triangular column of the cam may be provided on an opposite side of the support surface.

The cam stopper may integrally extend from the second bracket to be parallel with the support surface.

As described above, according to embodiments of the disclosure, the electronic device in which the door is coupled by the multi joint hinge may open and close the door without interference even if neighboring devices are disposed adjacent thereto. Here, when the resilient member for providing the closing force of the door is engaged with the cam provided on the bracket of the door, the multi joint hinge supports the cam by the cam stopper to block the movement of the cam. The cam stopper is integrally formed with the bracket, thereby allowing the bridge of the bracket, which has been often broken during the opening and closing operations of the door, to design wider in width. As a result, durability of the bracket may be not only enhanced, but also structure of the cam stopper may be simplified, thereby reducing manufacturing costs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
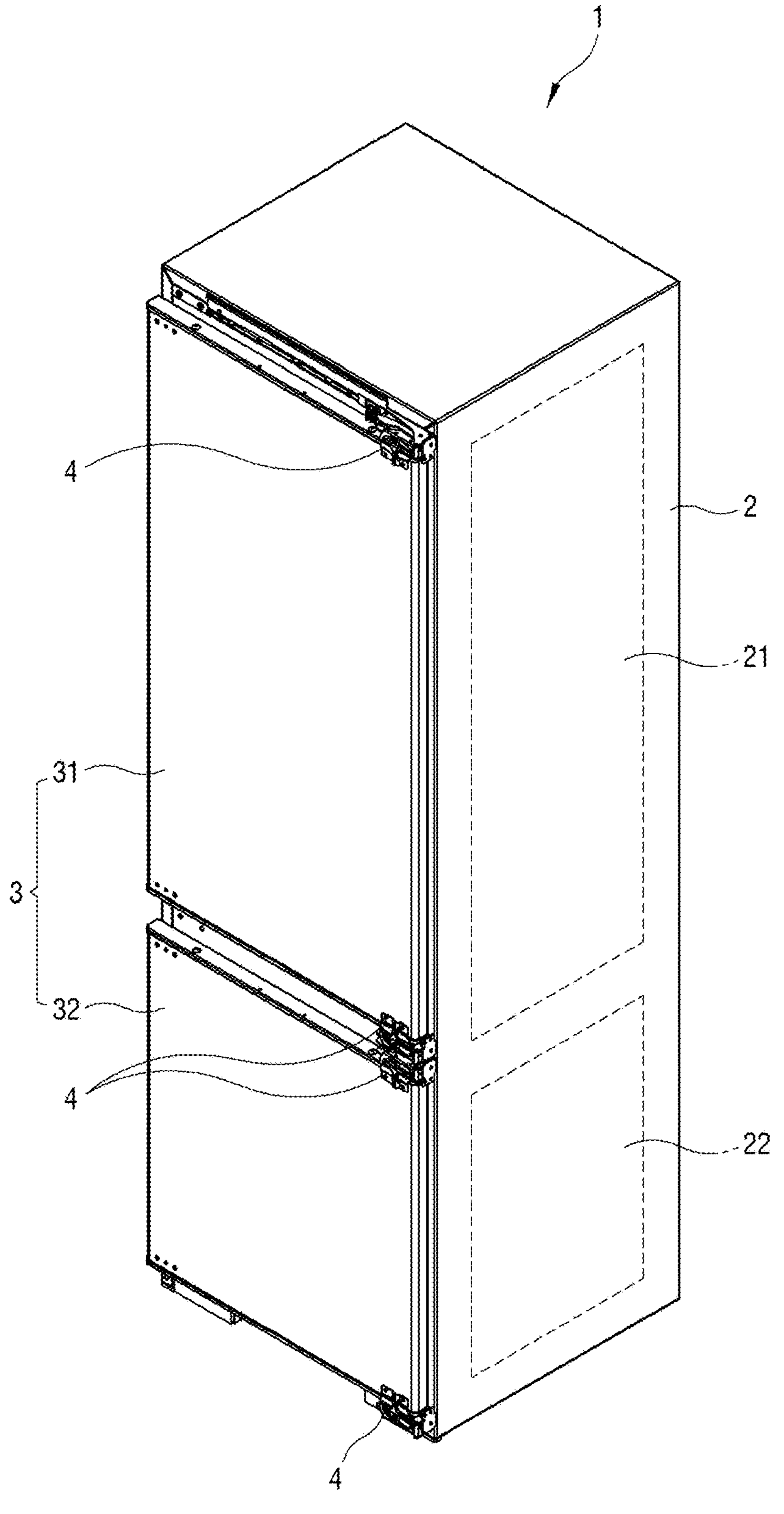
FIG. 1 is a view showing a refrigerator according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Below, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, terms "have," "may have," "include," "may include," etc. indicate the presence of corresponding features (e.g., a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In embodiments of the disclosure, terms including ordinal numbers such as first and second are used only for the purpose of distinguishing one component from other components, and singular expressions include plural expressions unless the context clearly indicates otherwise.

In addition, in the disclosure, terms "upper", "lower", "left", "right", "inside", "outside", "inner", "outer", "front", "rear", etc. are defined with respect to the accompanying drawings, and do not restrict the shape or location of the elements.

In the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance.

An electronic device according to an embodiment of the disclosure may include all devices, such as a refrigerator, a freezer, an ice making and storing device, a clothing care appliance, a wine cellar and the like, with which hinged doors are provided. Hereinafter, the electronic device will be described as, for example, a refrigerator 1.

FIG. 1 is a view showing a refrigerator according to various embodiments of the present disclosure. Here, for convenience of explanation, a door 3 was shown in an internal state from which a cover thereof removed.

As shown in FIG. 1, the refrigerator 1 may include a main body 2 having a refrigerator compartment 21 and a freezer compartment 22 at upper and lower parts thereof, respectively, and a door 3 having a first door 31 configured to open and close the refrigerator compartment 21 and a second door 32 configured to open and close the freezer compartment 22.

The first door 31 at upper and lower ends of one side thereof may be rotatably coupled to upper and lower ends of one side of the refrigerator compartment 21 of the main body 2 by a pair of hinges 4.

The second door 32 at upper and lower ends of one side thereof may be rotatably coupled to upper and lower ends of one side of the freezer compartment 22 of the main body 2 by a pair of hinges 4.

The hinges 4 may rotate the first and second doors 31 and 32 while moving them forward, thereby opening and closing them without interfering them with neighboring products. Constructions of the hinges 4 will be described later.

The refrigerator 1 according to the embodiment of the disclosure may for example be embodied by a double-door type, or three-door type refrigerator according to the number of doors and methods of opening the door.

Also, the refrigerator 1 according to the embodiment of the disclosure may include an indirect-cooling type or direct-cooling type standing refrigerator or a built-in premium freezer.

The refrigerator 1 according to the embodiment of the disclosure may be not limited by many various structures or uses but embodied by all the kinds of refrigerators having the doors.

Figure 2:
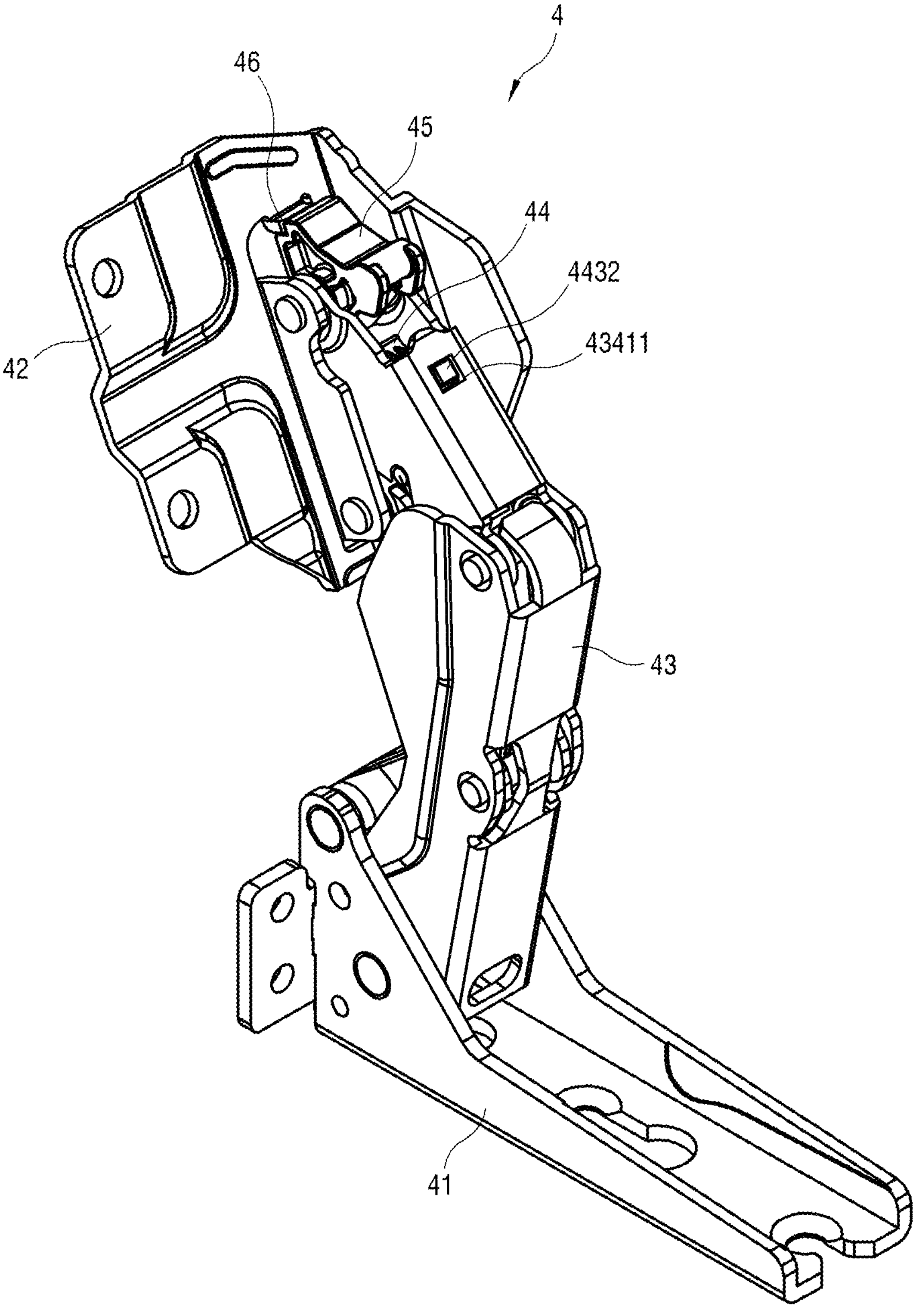
FIG. 2 is a view showing a hinge of FIG. 1 according to various embodiments of the present disclosure.
Figure 3:
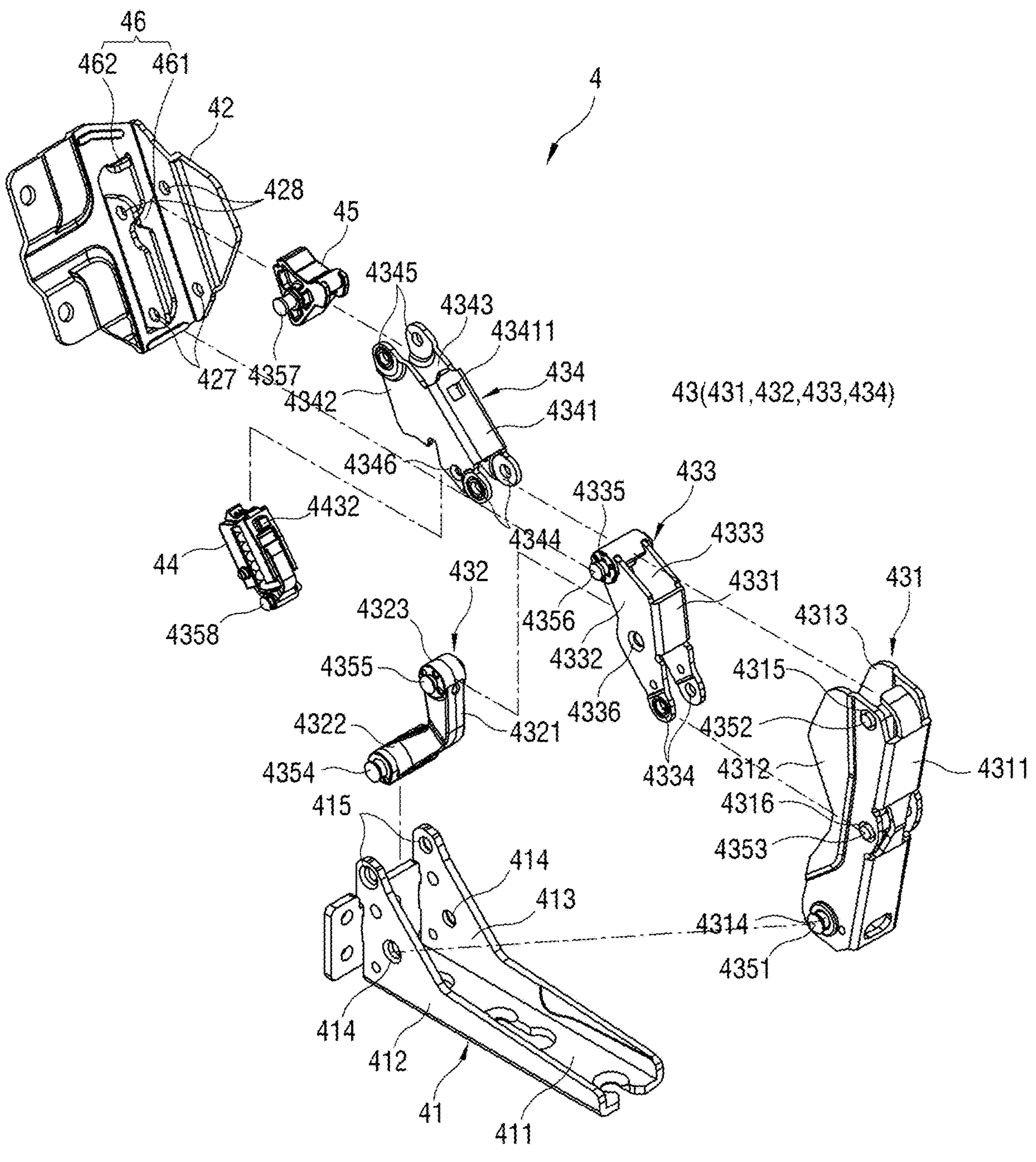
FIG. 3 is an exploded view showing the hinge of FIG. 1.

FIG. 2 is a view showing one of the hinges 4 of FIG. 1 according to various embodiments of the present disclosure, and FIG. 3 is an exploded view showing one of the hinges 4 of FIG. 1.

As shown in FIG. 2, the hinge 4 may include a first bracket 41 supported by the main body 2, a second bracket 42 supported by the door 3, a link 43 rotatably coupled between the first bracket 41 and the second bracket 42, a resilient member 44 provided on the link 43, a cam 45 provided on the second bracket 42 and a cam stopper 46 configured to prevent the cam 45 from being moved.

As shown in FIG. 3, the first bracket 41 may be fixed to and supported on the main body 2. The first bracket 41 includes a first base 411 in a form of a plate, which is extended by a given width and fixedly supported on the main body 2, and first and second link supports 412 and 413, which are integrally bent and project from both side surfaces of the first base 411. On the first and second link supports 412 and 413 are formed first and second hinge coupling holes 414 and 415 are formed on to rotatably couple one end of the link 43.

The second bracket 42 may be fixed to the door 3 in order to couple the other end of the link 43.

Figure 4:
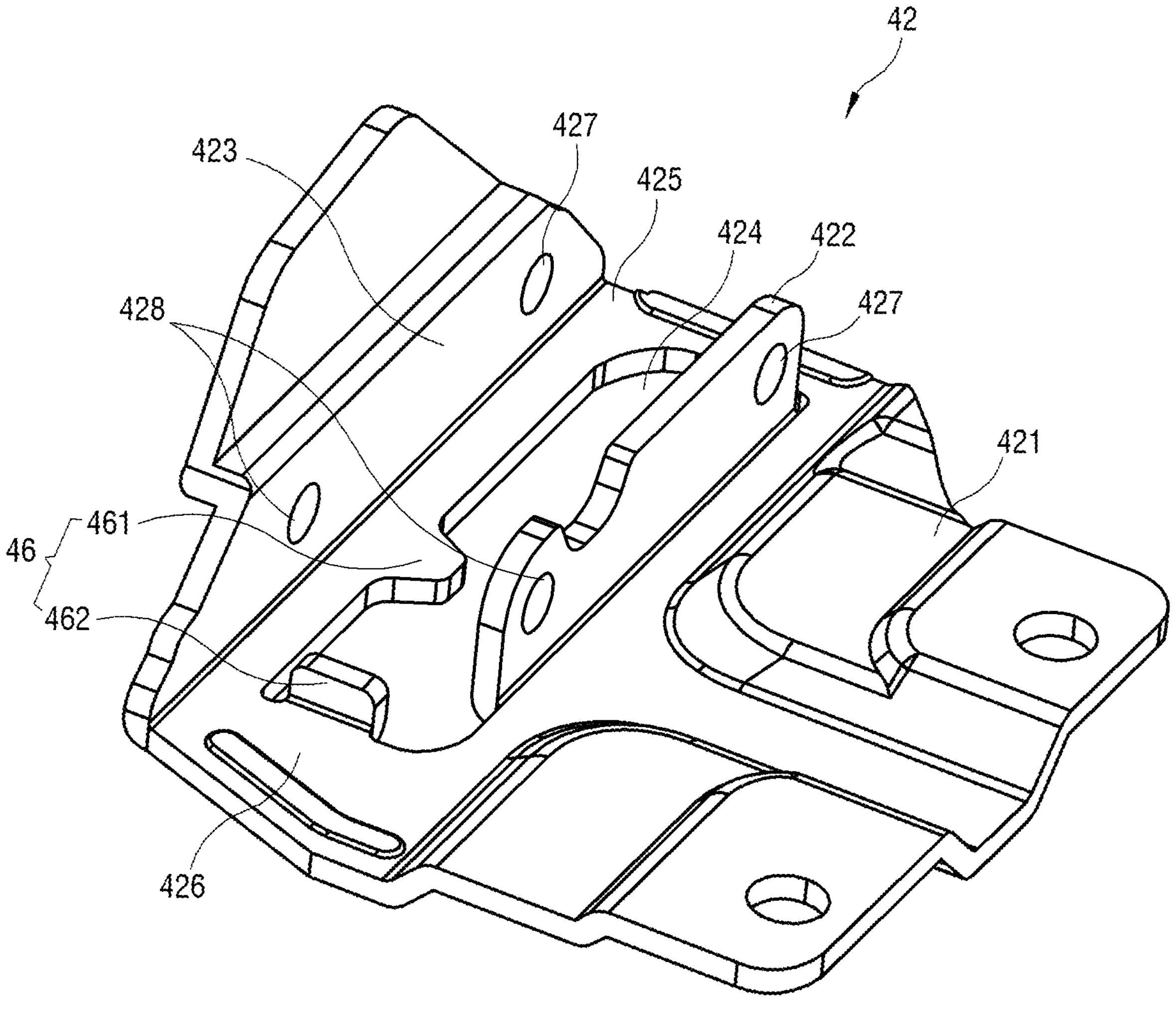
FIG. 4 is a view showing a second bracket according to various embodiments of the present disclosure.

FIG. 4 is a view showing the second bracket 42 according to various embodiments of the present disclosure.

As shown in FIG. 4, the second bracket 42 includes a second base 421 in a form of a plate, which is fixed and supported on the door 3, and third and fourth link supports 422 and 423, which are spaced by a given width and bent from a plate surface of the second base 421.

The third link support 422 is formed by cutting one region of the second base 421 and then bending the one region to make it upright. As a result, in the second base 421 may formed an opening 424 cut and remained to form the third link support 422. The second base 421 may include first and second bridges 425 and 426 formed at one side and the other side of the opening 424.

The fourth link support 423 is formed by bending one side of the second base 421 so as to be arranged side by side with the third link support 422 while being spaced apart from the third link support 422 and intervening the opening 424 between the third link support 422 and the fourth link support 423.

The third and fourth link supports 422 and 423 are formed with third and fourth hinge coupling holes 427 and 428 to rotatably couple the outer end of the link 43.

The second base 421 may include a cam stopper 46 to prevent the cam 45 from being moved.

The cam stopper 46 may include a first cam stopper 461, which projects into the opening 424, and a second cam stopper 462, which is bent and extended upright from an edge of the second bridge 426 forming the opening 424. Like this, the second cam stopper 462 is formed by integrally bending a portion around the opening 424 of the second base 421, thereby allowing the second bridge 426 to have more width, which raises durability of the second bridge and the second bracket having the same.

Referring again to FIG. 3, the link 43 may include a first link member 431, a second link member 432, a third link member 433 and a fourth link member 434.

The first link member 431 may include a third base 4311 that is narrower than the first base 411 of the first bracket 41, and fifth and sixth link supports 4312 and 4313 extended upright from both sides of the third base 4311.

The fifth and sixth link supports 4312 and 4313 may include a fifth hinge coupling hole 4314, a sixth hinge coupling hole 4315 and a seventh hinge coupling hole 4316, which are provided at one end, the other end and a middle thereof, respectively.

The first link member 431 may be configured, so that the fifth hinge coupling hole 4314 in one end thereof is rotatably coupled to the first hinge coupling hole 414 of the first bracket 41 by a first hinge pin 4351, the sixth hinge coupling hole 4315 in the other end thereof is rotatably coupled to one end of the fourth link member 434 by a second hinge pin 4352, and the seventh hinge coupling hole 4316 in a middle thereof is rotatably coupled to one end of the third link member 433 by a third hinge pin 4353.

The second link member 432 may include a link base 4321 in a form of a bar bent in the middle, and first and second hinge couplers 4322 and 4323 extended in a horizontal or transverse direction at both ends of the link base 4321 and being hollow.

The second link member 432 may be configured, so that the first hinge coupler 4322 in an end thereof is rotatably coupled to the second hinge coupling hole 415 of the first bracket 41 by a fourth hinge pin 4354 and the second hinge coupler 4323 in another end thereof is rotatably coupled to a middle of the third link member 433 by a fifth hinge pin 4355.

The third link member 433 may include a fourth base 4331 in a form of a plate, and seventh and eighth link supports 4332 and 4333 extended side by side and upright at both sides of the fourth base 4331. The seventh and eighth link supports 4332 and 4333 project frontward and rearward from the fourth base 4331, respectively.

Each of the seventh and eighth link supports 4332 and 4333 include an eighth hinge coupling hole 4334, a ninth hinge coupling hole 4335 and a tenth hinge coupling hole 4336, which are provided at one end, the other end and a middle thereof, respectively.

The third link member 433 may be configured, so that the eighth hinge coupling holes 4334 in one end thereof are rotatably coupled to the seventh hinge coupling hole 4316 in the middle of the first link member 431 by the third hinge pin 4353, the ninth hinge coupling holes 4335 in the other end thereof are coupled to the third hinge coupling holes 427 of the third link support 422 of the second bracket 42 by the sixth hinge pin 4356, and the tenth hinge coupling hole 4336 in a middle thereof are coupled to the second hinge coupler 4323 of the second link member 432 by the fifth hinge pin 4355.

The fourth link member 434 may include a fifth base 4341 in a form of a plate, and ninth and tenth link supports 4342 and 4343 extended side by side and upright from both sides of the fifth base 4341. The fifth base 4341 is provided with an opening 43411 in which a stopping projection 4432 of the resilient member 44 to be described later is inserted. The ninth and tenth link supports 4342 and 4343 project frontward and rearward from the fifth base 4341, respectively.

Each of the ninth and tenth link supports 4342 and 4343 include an eleventh hinge coupling hole 4344 formed at one end thereof, a twelfth hinge coupling hole 4345 formed at the other end thereof, and a thirteenth hinge coupling hole 4346 formed adjacent to the eleventh hinge coupling hole 4344.

The fourth link member 434 may be configured, so that the eleventh hinge coupling holes 4344 in one end thereof are rotatably coupled to the sixth hinge coupling holes 4315 in the other end of the first link member 431 by the second hinge pin 4352 and the twelfth hinge coupling hole 4345 in the other end thereof are coupled to the fourth hinge coupling holes 428 of the third and fourth link support 422 and 423 of the second bracket 42 by the seventh hinge pin 4357.

The resilient member 44 at one end of thereof may be coupled to the thirteenth hinge coupling hole 4346 in one end of the fourth link member 434 by the eighth hinge pin 4358. The resilient member 44 may be disposed between the ninth link support 4342 and the tenth link support 4343 in a state where one end of thereof is supported on the fourth link member 434.

Figure 5:
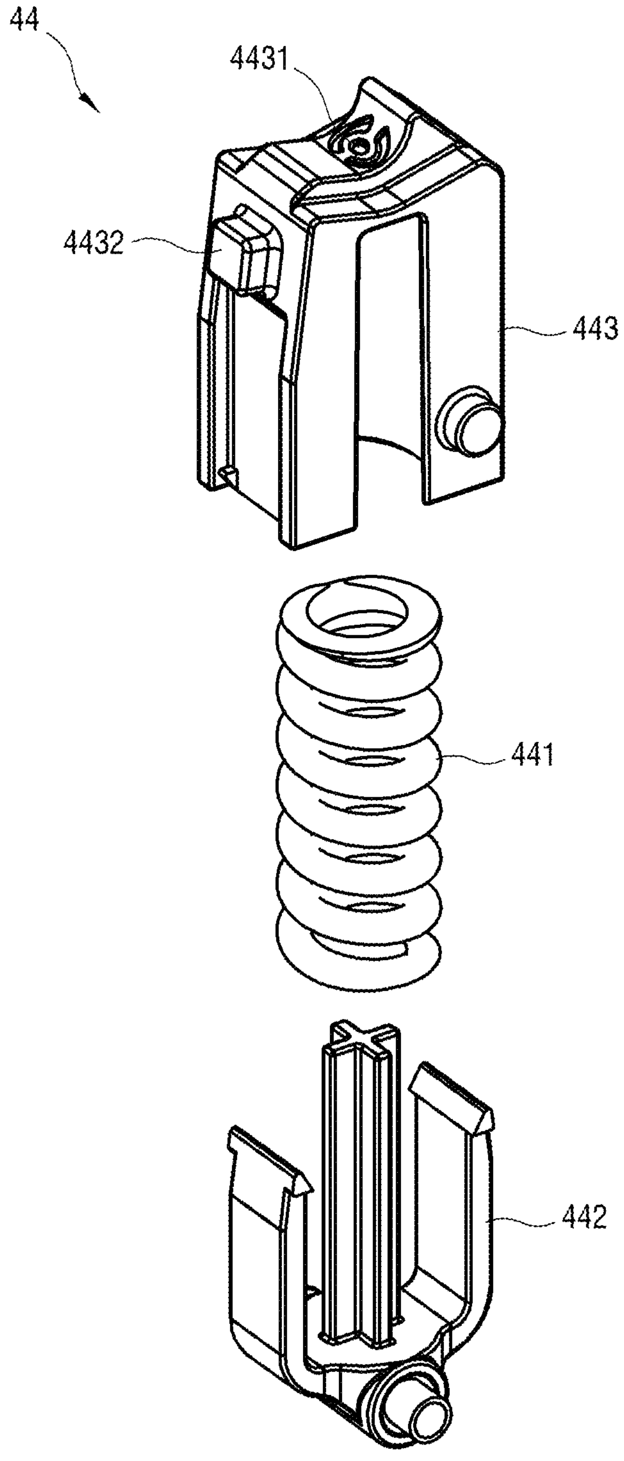
FIG. 5 is an exploded view showing a resilient member.

FIG. 5 is an exploded view showing the resilient member 44.

As shown in FIG. 5, the resilient member 44 may include a spring 441, a fixing casing 442 can accommodate one side of the spring 441 therein, and a moving casing 443 can accommodate the other side of the spring 441 therein and engaged to slide with respect to the fixing casing 442.

The moving casing 443 may include a cam engaging jaw 4431 provided in an end thereof opposite to the fixing casing 442 to selectively engage with the cam 45, and a stopping projection 4432 projects from a side surface thereof facing the fifth base 4341. The stopping projection 4432 may be inserted into the opening 43411 of the fifth base 4341 during an opening operation of the door 3, as shown in FIG. 2.

Figure 6:
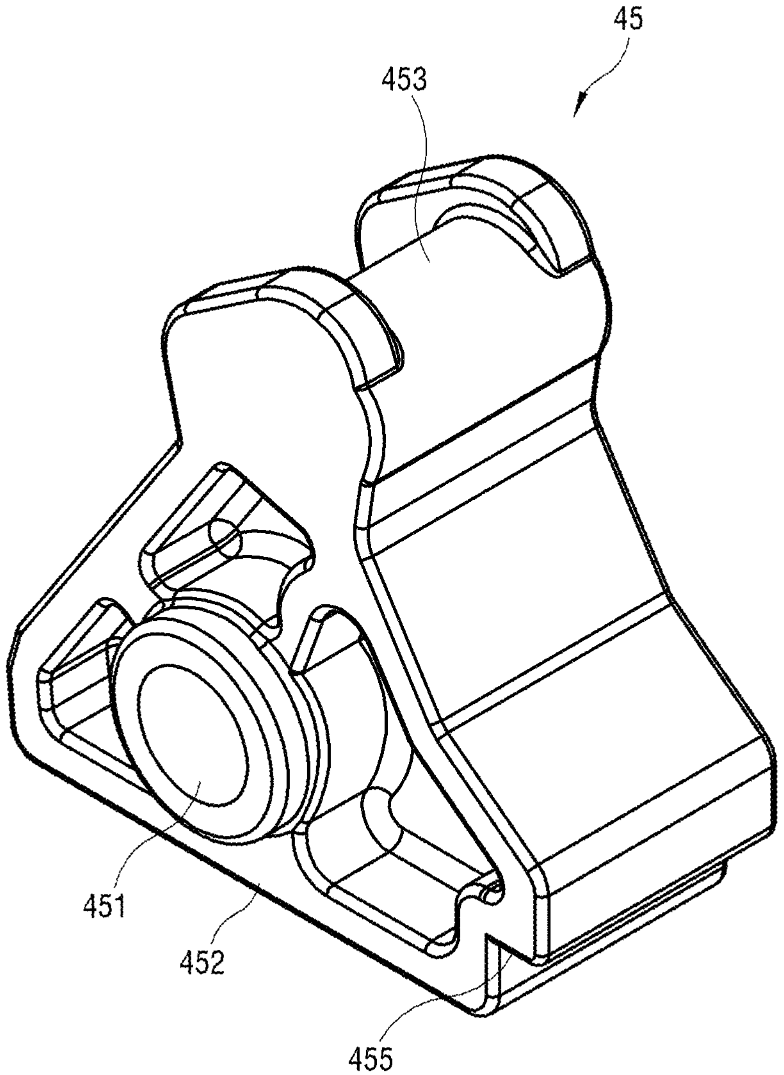
FIG. 6 is a view showing a cam according to various embodiments of the present disclosure.
Figure 7:
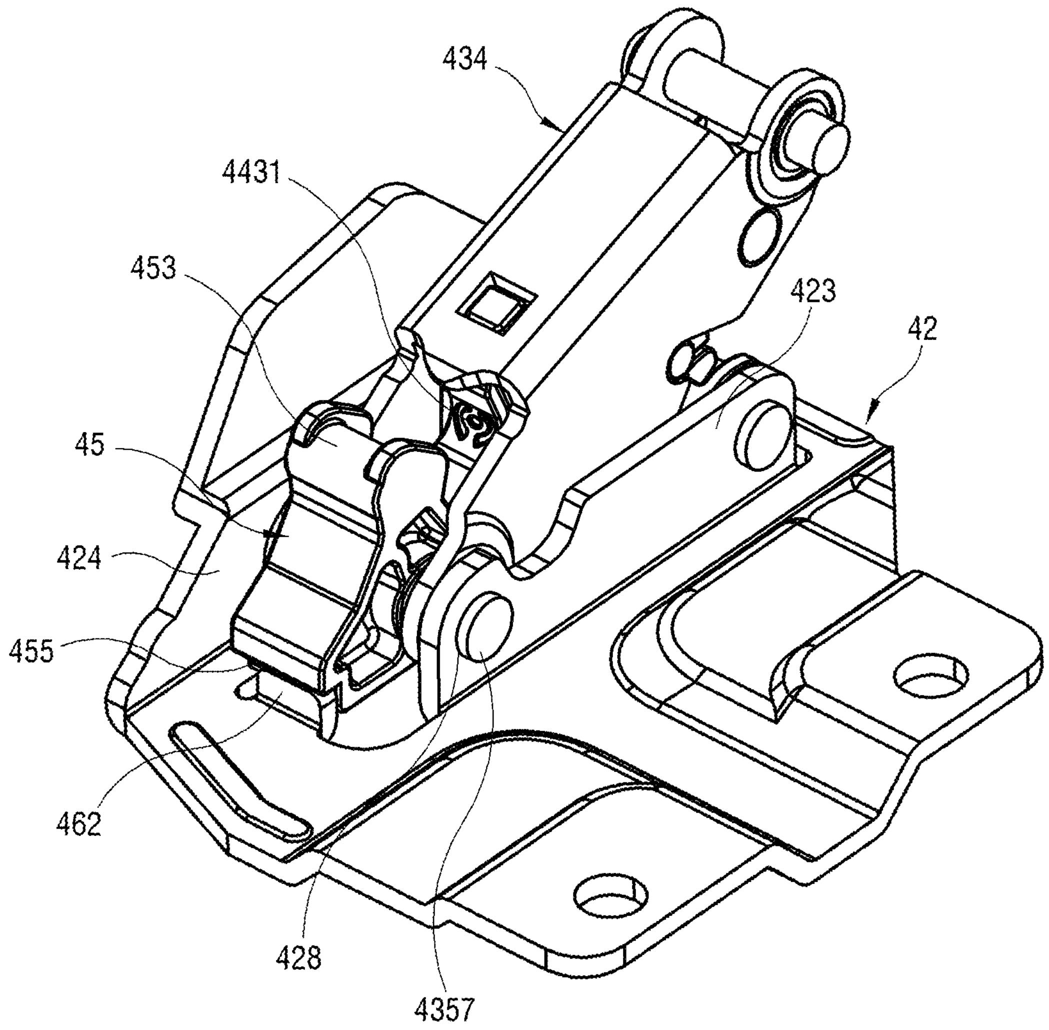
FIG. 7 is a view showing a coupled state of the cam and the second bracket according to various embodiments of the present disclosure.

FIG. 6 is a view showing the cam 45 according to various embodiments of the present disclosure, and FIG. 7 is a view showing a coupled state of the cam 45 and the second bracket 42.

As shown in FIGS. 6 and 7, the cam 45 may be coupled to the second bracket 42 together with the other end of the fourth link member 434.

The cam 45 may include a fourteenth hinge coupling hole 451 formed in a shape of a substantial triangular column to penetrate a middle thereof, a support surface 452 supported on the second bracket 42, and a cam projection 453 provided on a side thereof opposite to the support surface 452. The cam 45 may be include a hanging jaw 455 provided on a side of the support surface 452 to engage with the second cam stopper 462.

The cam 45 may be configured, so that by the seventh hinge pin (4357 in FIG. 3), the fourteenth hinge coupling hole 451 of the middle thereof is coupled to the fourth hinge coupling holes 428 of the third and the fourth link supports 422 and 423 of the second bracket 42 together with the twelfth hinge coupling holes 4345 in the other end of the fourth link member 434. In the coupled state, at least a portion of the cam 45 may be positioned in the opening (424 in FIG. 4) of the second bracket 42. Here, the cam 45 may be configured, so that the side of the support surface 452 comes in surface contact with first cam stopper (461 in FIG. 4) and the hanging jaw 455 engages with the second cam stopper (462 of FIGS. 4 and 7).

Figure 8:
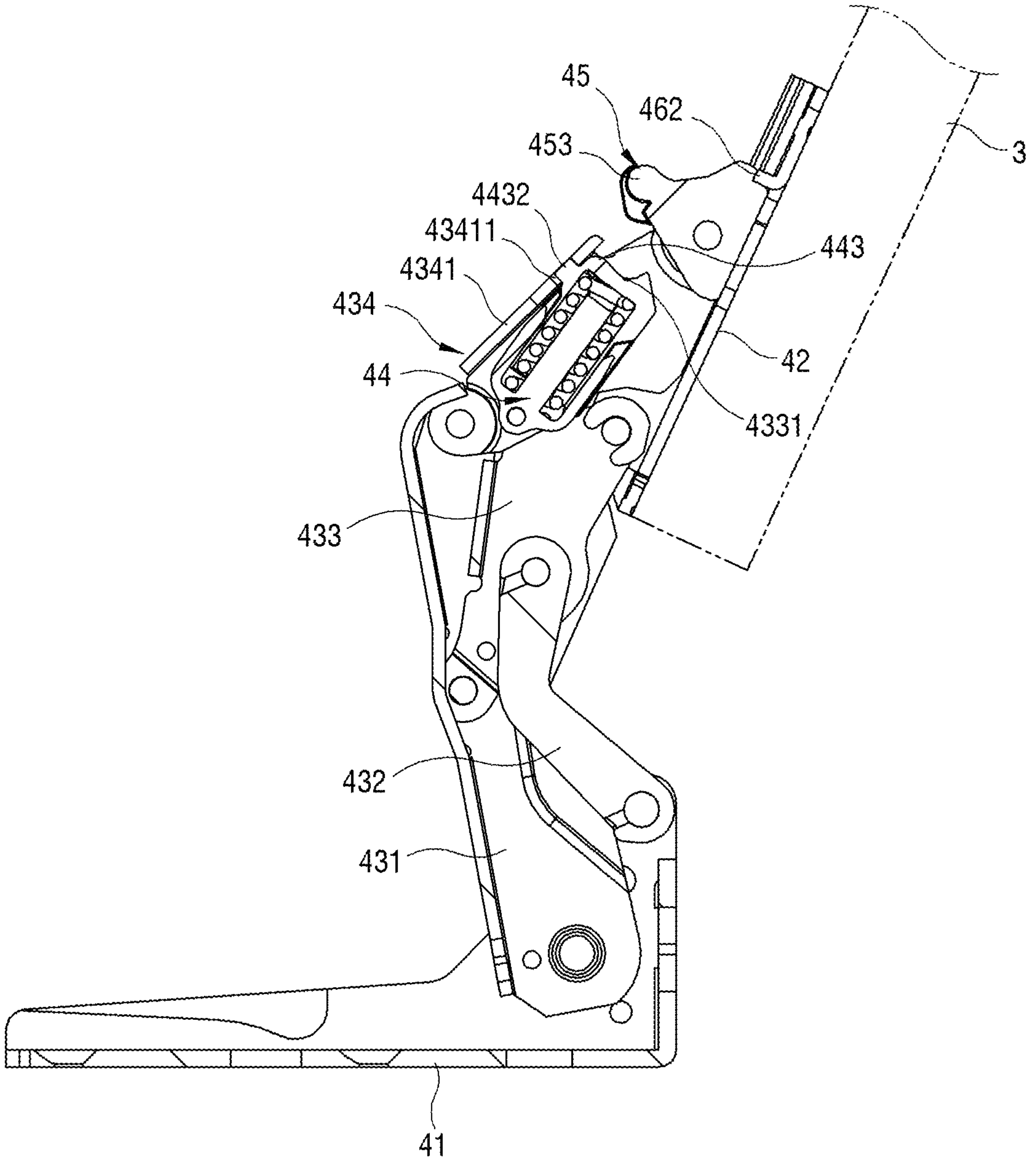
FIG. 8 is a cross-section view showing the hinge when a door is opened at an angle of 115° from a main body according to various embodiments of the present disclosure.
Figure 9:
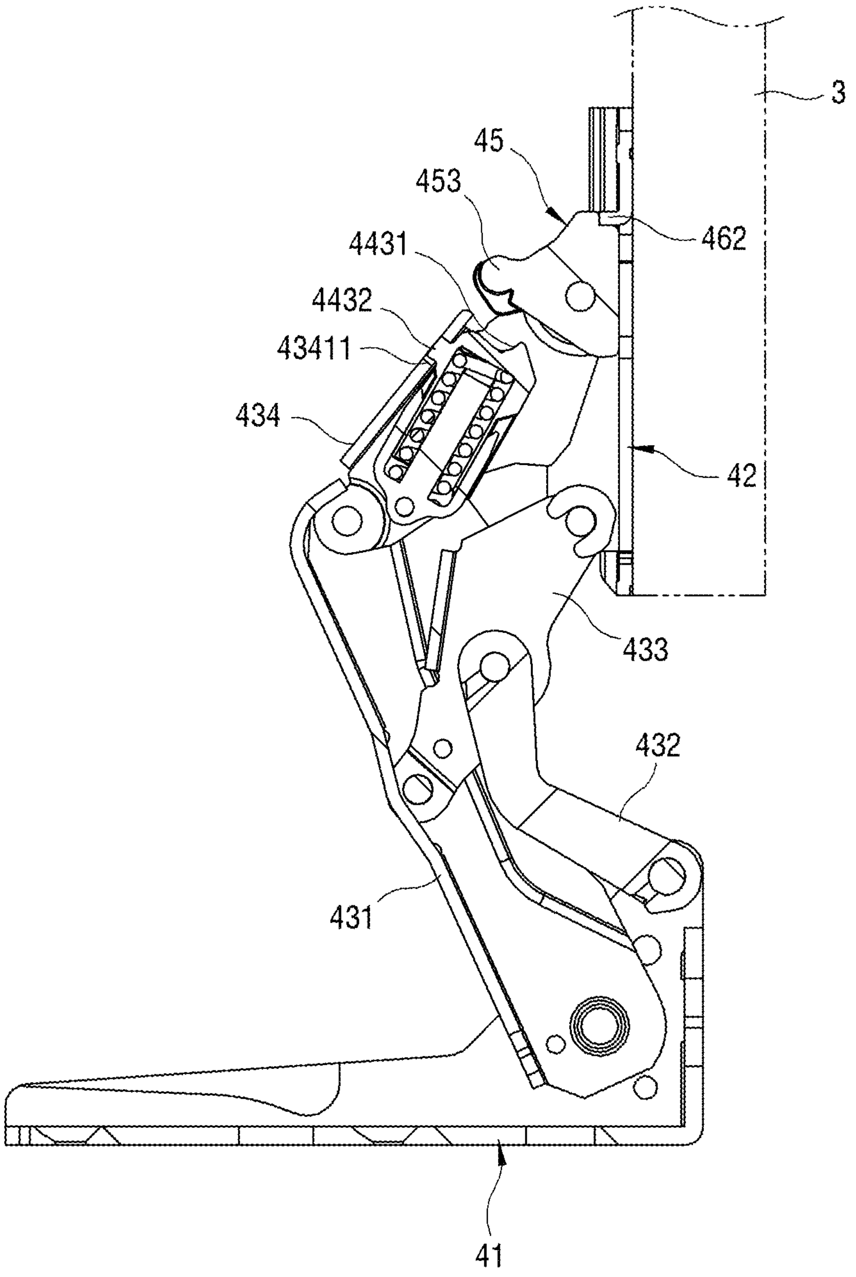
FIG. 9 is a cross-section view showing the hinge when the door is opened at an angle of 90° from the main body according to various embodiments of the present disclosure.
Figure 10:
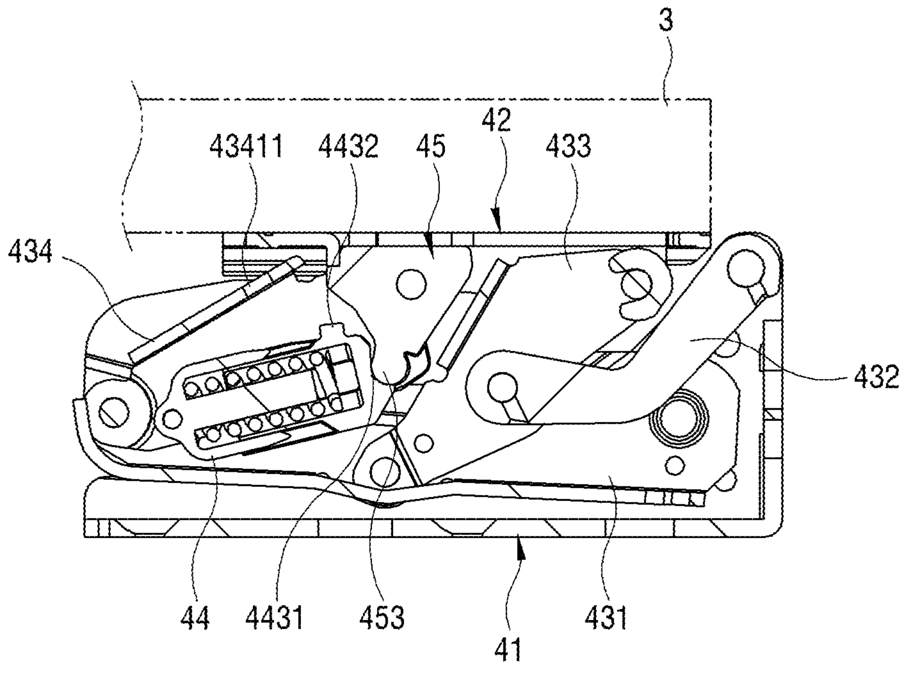
FIG. 10 is a cross-section view showing the hinge when the door is closed to the main body according to various embodiments of the present disclosure.

FIG. 8 is a cross-section view showing the hinge 4 when the door 3 is opened at an angle of 115° from the main body 2, FIG. 9 is a cross-section view showing the hinge 4 when the door 3 is opened at an angle of 90° from the main body 2, and FIG. 10 is a cross-section view showing the hinge 4 when the door 3 is closed to the main body 2.

Referring to FIG. 8, the first link member 431 and the second link member 432 are in a state where they are rotated at an angle of approximately 90° to be upright with respect to the first bracket 41, and the third link member 433 and the fourth link member 434 are in a state where they are rotated at an angle of approximately 115° to be upright with respect to the first bracket 41. Here, the cam engaging jaw 4431 of the resilient member 44 is separated from the cam projection 453 of the cam 45. The reason is that in the opening operation of the door 3, the stopping projection 4432 of the resilient member 44 is inserted into the opening 43411 of the fifth base 4341 of the fourth link member 434 to restrict the moving casing 443 from being slidably moved.

Referring to FIG. 9, the first link member 431 and the second link member 432 are in a state where they are rotated in a counterclockwise direction to be upright at an angle of approximately 65° with respect to the first bracket 41 and the door 3 is in a state, which is upright at an angle of approximately 90°. Here, the cam engaging jaw 4431 of the resilient member 44 is separated from the cam projection 453 of the cam 45. The stopping projection 4432 of the resilient member 44 is maintained in the state inserted into the opening 43411 of the fifth base 4341 of the fourth link member 434.

In the state shown in FIG. 9, if the door 3 is rotated in the counterclockwise direction, one side surface of the cam projection 453 is engaged with the cam engaging jaw 4431 of the resilient member 44. And then, if the door 3 is further rotated in the counterclockwise direction, the stopping projection 4432 of the resilient member 44 comes to break away from the opening 43411 of the fifth base 4341 of the fourth link member 434 at the state where the cam projection 453 of the cam 45 is engaged with the cam engaging jaw 4431 of the resilient member 44. As the door 3 continues to rotate in the counterclockwise direction, a middle portion and the other side surface of the cam projection 453 come to be sequentially engaged with the cam engaging jaw 4431 of the resilient member 44.

Referring to FIG. 10, the first link member 431 and the second link member 432 are in a state where they are rotated in the counterclockwise direction to be folded at an angle of approximately 0° with respect to the first bracket 41, and the third link member 433 and the fourth link member 434 are in a state where they are rotated in a clockwise direction to be folded at an angle of approximately 0° with respect to the first bracket 41. Here, as the cam engaging jaw 4431 of the resilient member 44 exerts elastic force on the other side surface of the cam projection 453, the cam 45 is subjected to counterclockwise rotational force. The second cam stopper 462 may block the counterclockwise rotational force of the cam 45. As a result, the resilient member 44 may continue to provide closing force in a state where the door 3 is closed.

In the state shown in FIG. 10, to open the door 3, if the door 3 is rotated in the clockwise direction, the middle portion of the cam projection 453 is engaged with the cam engaging jaw 4431 of the resilient member 44. At this time, the resilient member 44 exerts the greatest elastic force on the cam 45. And then, if the door 2 is further rotated in the clockwise direction, one side surface of the cam projection 453 is engaged with the cam engaging jaw 4431 of the resilient member 44, thereby allowing the resilient member 44 to provide opening force, which rotates the door 3 in the clockwise direction. Such an opening force of the resilient member 44 exerts until the door 3 is rotated in the clockwise direction to allow the stopping projection 4432 of the resilient member 44 to be inserted into the opening 43411 of the fifth base 4341 of the fourth link member 434. As the resilient member 44 exerts the elastic force on one side surface of the cam projection 453, the cam 45 is subjected to the clockwise rotational force Such a clockwise rotation of the cam 45 may be blocked by the first cam stopper 461 and the second cam stopper 462.

Figure 11:
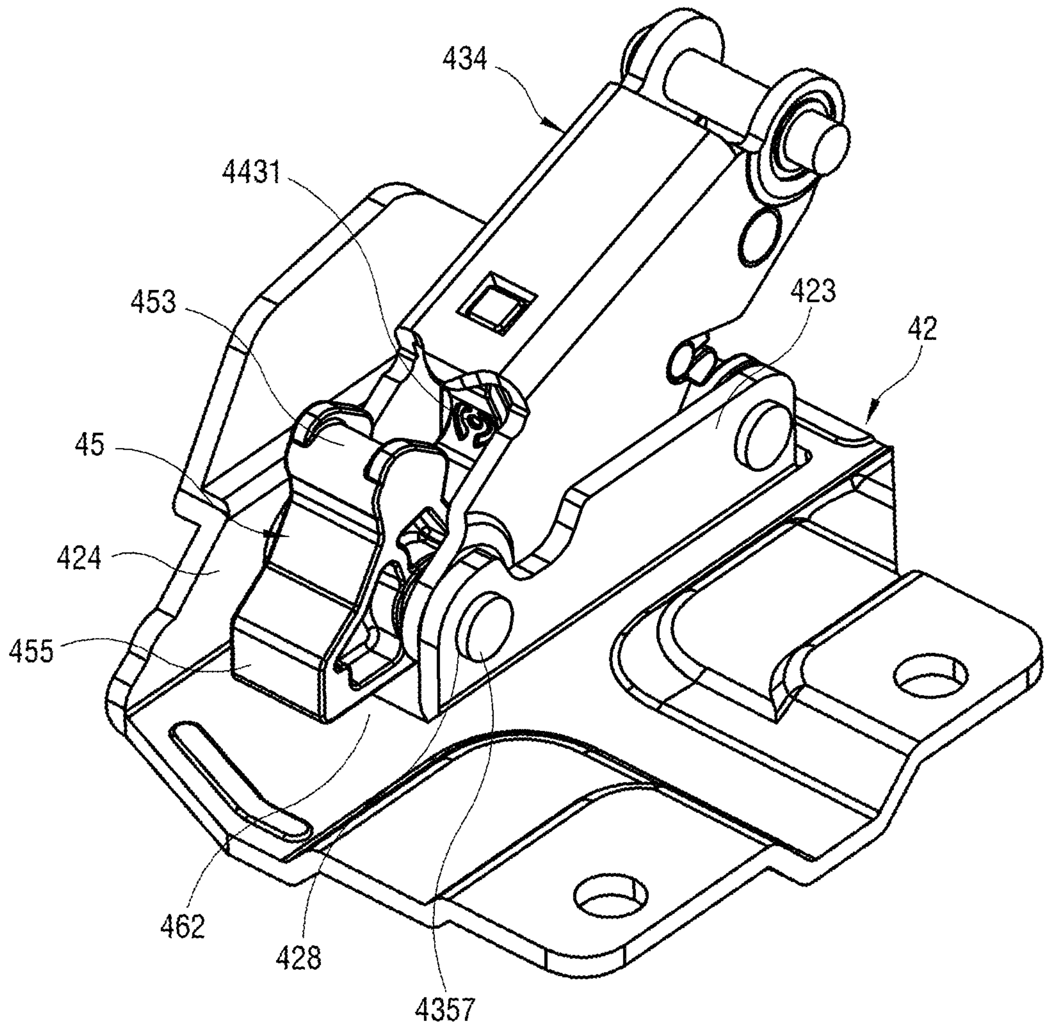
FIG. 11 is a view showing a cam and a cam stopper according to various embodiments of the present disclosure.

FIG. 11 is a view showing the cam 45 and the cam stopper 46 according to various embodiments of the present disclosure.

As shown in FIG. 11, a second cam stopper 462, which supports the cam 45, is the plate surface itself of the second base 421 coming in contact with the support surface 452 of the cam 45. The elastic force of the resilient member 44, which is a force of rotating the cam 45 in the clockwise direction, may be blocked by the second cam stopper 462 composed of the plate surface of the second base 421, which has come in contact with the support surface 452. Like this, to form the third link support 422, an area of cutting out the second base 421 may be minimized, thereby allowing the second bridge 426 of the second bracket 42 to be formed wider in width.

Figure 12:
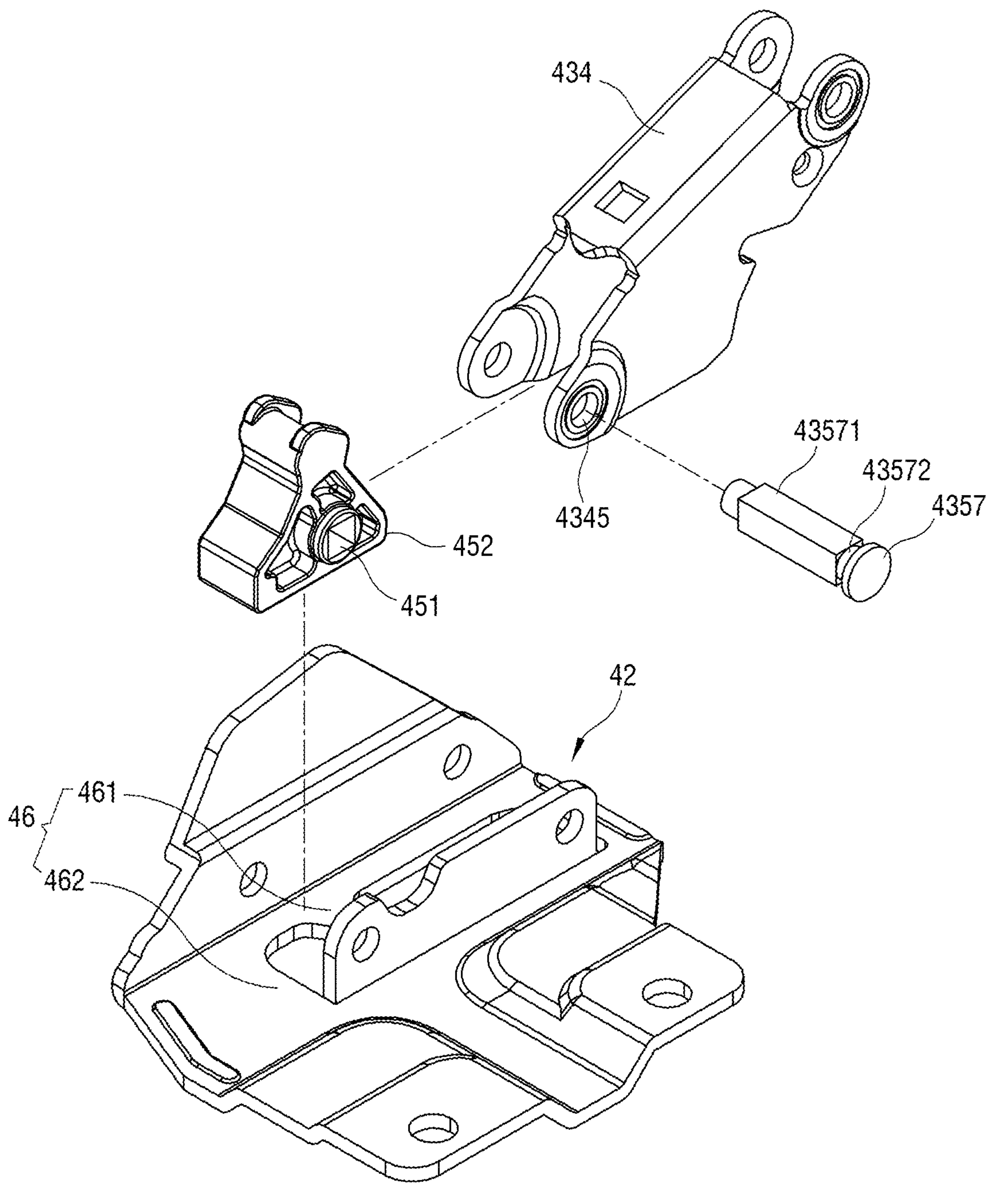
FIG. 12 is a view showing a cam and a cam stopper according to various embodiments of the present disclosure.

FIG. 12 is a view showing the cam 45 and the cam stopper 46 according to various embodiments of the present disclosure.

As shown in FIG. 12, the cam 45 at a middle thereof may include a fourteenth hinge coupling hole 451 in a form of, for example, a tetragonal cross section in which a seventh hinge pin 4357 is inserted. Likewise, a portion 43571 of the seventh hinge pin 4357, which is inserted into the fourteenth hinge coupling hole 451, may be formed in a form of the tetragonal cross section. A portion 43572 of the seventh hinge pin 4357, which is inserted into the twelfth hinge coupling hole 4345 in the other end of the fourth link member 434, may be formed in a form of a cylinder to allow the fourth link member 434 to be rotated. Here, the seventh hinge pin 4357 and the fourteenth hinge coupling hole 451 may be formed in a polygon cross section other than the tetragonal cross section.

Since a construction of the cam stopper 46 is the same as that shown in FIG. 1, explanations thereon are omitted.

Figure 13:
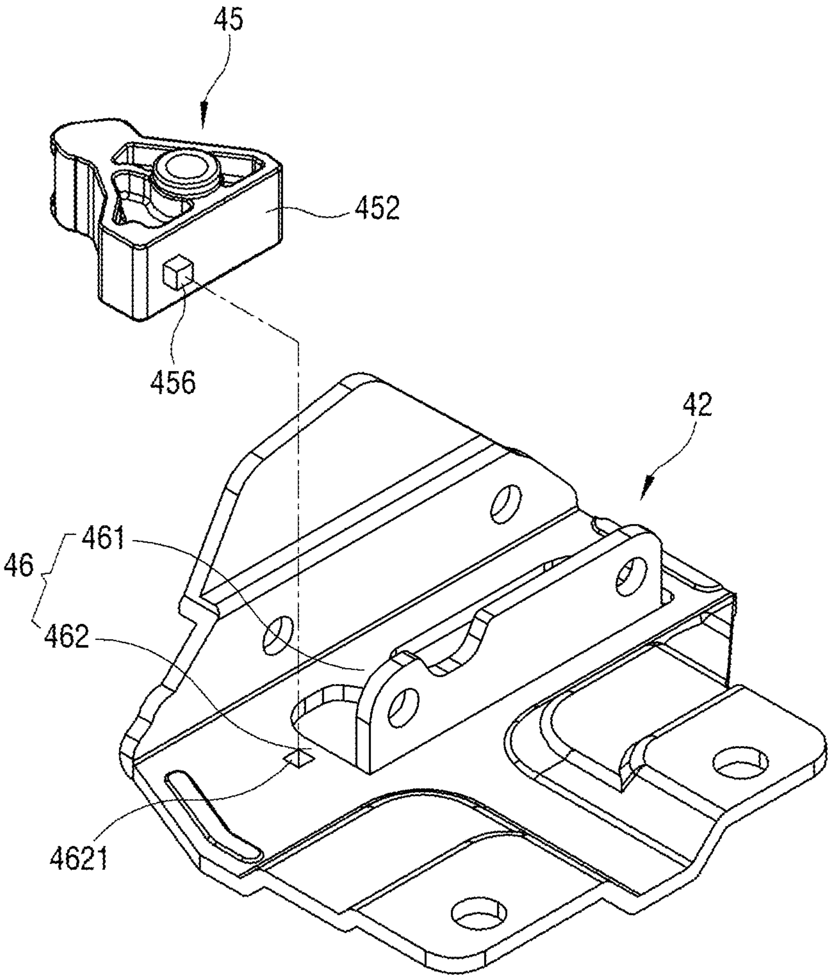
FIG. 13 is a view showing a cam and a cam stopper according to various embodiments of the present disclosure.

FIG. 13 is a view showing the cam 45 and the cam stopper 46 according to various embodiments of the present disclosure.

The cam 45 may include a projection 456 that projects from the support surface 452. The second cam stopper 462 may include a through hole 4621 in which the projection 456 of the cam 45 is inserted.

As a modified embodiment, the cam may include a groove formed on the support surface thereof, and the second cam stopper may include a projection, which is inserted into the groove of the cam.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a main body having a storage space therein;
a door configured to open and close the storage space; and
a hinge coupled to the door and the main body in order to rotate the door with respect to the main body,
wherein the hinge comprises:
a first bracket supported by the main body;
a second bracket supported by the door;
a link rotatably coupled between the first bracket and the second bracket; a resilient member provided on the link and having an elasticity;
a cam provided on the second bracket and formed in a shape to contact the resilient member, so that according to a rotation direction of the door, the elasticity of the resilient member acts as an opening force or a closing force of the door; and
a cam stopper integrally formed with the second bracket to prevent the cam from being moved by the elasticity of the resilient member,
wherein the cam comprises a triangular column and is anchored to the second bracket by a single through-hole.

2. The electronic device according to claim 1, wherein:
the cam comprises a support surface provided parallel with a plate surface of the second bracket, and
the triangular column of the cam is provided on an opposite side of the support surface.

3. The electronic device according to claim 2, wherein the cam comprises a hanging jaw to support the cam stopper.

4. The electronic device according to claim 2, wherein the cam stopper integrally extends from the second bracket to be parallel with the support surface.

5. The electronic device according to claim 2, wherein the support surface is configured to come in contact with the cam stopper.

6. The electronic device according to claim 2, wherein:
the support surface is provided with a projection, which is inserted into the through hole.

7. The electronic device according to claim 2, wherein:
the support surface comprises a groove, and
the cam stopper comprises a projection, which is inserted into the groove and integrally projects from the second bracket.

8. The electronic device according to claim 1, wherein the cam stopper is integrally bent and projects from a plate surface of the second bracket to support the cam.

9. The electronic device according to claim 1, further comprising:
a hinge pin that couples the cam to the second bracket together with an end of the link.

10. The electronic device according to claim 9, wherein:
the cam comprises a hinge coupling hole in a form of a polygon column, which extends in up and down directions thereof, and
the hinge pin comprises a portion that has a cross section in the form of the polygon column that is inserted into the hinge coupling hole.

11. A refrigerator comprising:

a main body having a refrigerator compartment and a freezer compartment;

at least one door configured to open and close the refrigerator compartment and the freezer compartment; and a hinge coupled to a door of the at least one door and the main body in order to rotate the door with respect to the main body, wherein the hinge comprises:

a first bracket supported by the main body;

a second bracket supported by the door;

a link rotatably coupled between the first bracket and the second bracket;

a resilient member provided on the link and having an elasticity;

a cam provided on the second bracket and formed in a shape to contact the resilient member, so that according to a rotation direction of the door, the elasticity of the resilient member acts as an opening force or a closing force of the door; and a cam stopper integrally formed with the second bracket to prevent the cam from being moved by the elasticity of the resilient member, wherein the cam comprises a triangular column and is anchored to the second bracket by a single through-hole.

12. The refrigerator according to claim 11, wherein:

the cam comprises a support surface provided parallel with a plate surface of the second bracket, and the triangular column of the cam is provided on an opposite side of the support surface.

13. The refrigerator according to claim 12, wherein the cam stopper integrally extends from the second bracket to be parallel with the support surface.

14. The refrigerator according to claim 12, wherein the support surface is configured to come in contact with the cam stopper.

15. The refrigerator according to claim 12, wherein:

the support surface is provided with a projection, which is inserted into the through hole.

16. The refrigerator according to claim 12, wherein:

the support surface comprises a groove, and the cam stopper comprises a projection, which is inserted into the groove and integrally projects from the second bracket.

17. The refrigerator according to claim 11, wherein the cam stopper is integrally bent and projects from a plate surface of the second bracket to support the cam.

18. The refrigerator according to claim 11, further comprising:

a hinge pin that couples the cam to the second bracket together with an end of the link.

* * * * *